United States Patent [19]

Dubuisson et al.

[11] Patent Number: 4,778,651
[45] Date of Patent: Oct. 18, 1988

[54] AUSTENITIC STAINLESS STEEL, PARTICULARLY USABLE AS A CORE STRUCTURAL OR CANNING MATERIAL IN NUCLEAR REACTORS

[75] Inventors: Philippe Dubuisson; Viviane Levy, both of Paris; Jean-Louis Seran, Meudon, all of France

[73] Assignee: Commissariat a l'Energie Atomique, Paris, France

[21] Appl. No.: 942,450

[22] Filed: Dec. 16, 1986

[30] Foreign Application Priority Data

Dec. 17, 1985 [FR] France .................. 85 18699

[51] Int. Cl.⁴ .................. C22C 38/44; C22C 38/60
[52] U.S. Cl. .................. 420/57; 420/56; 148/325; 148/327
[58] Field of Search .................. 148/325, 326, 327; 420/56, 43, 57, 58, 59

[56] References Cited

U.S. PATENT DOCUMENTS 4,576,641  3/1986  Bates et al. .................. 148/327

FOREIGN PATENT DOCUMENTS

| 791803 | 12/1935 | France . |
| 47686 | 6/1937 | France . |
| 2318237 | 2/1977 | France . |
| 2394237 | 1/1979 | France . |
| 897423 | 11/1953 | Fed. Rep. of Germany . |
| 0011015 | 1/1979 | Japan .................. 420/43 |
| 0563765 | 8/1944 | United Kingdom .................. 420/56 |

Primary Examiner—L. Dewayne Rutledge
Assistant Examiner—David W. Schumaker
Attorney, Agent, or Firm—Michael N. Meller

[57] ABSTRACT

The invention relates to austenitic stainless steels, which resist swelling under irradiation.

These steels contain at least one additional element chosen from among tin, germanium and antimony and having a total content from 0.05 to 1% by weight.

The presence of one or more of these elements chosen from among germanium, tin and antimony makes it possible to limit the swelling phenomenon. Therefore these steels can be used in nuclear reactors.

14 Claims, 5 Drawing Sheets

Z8 CND 17-12     C

C     Z8 CND 17-12-0.3GE

C     Z8 CND 17-12-0.5SB

Z8 CND 17-12-0.5SN     C

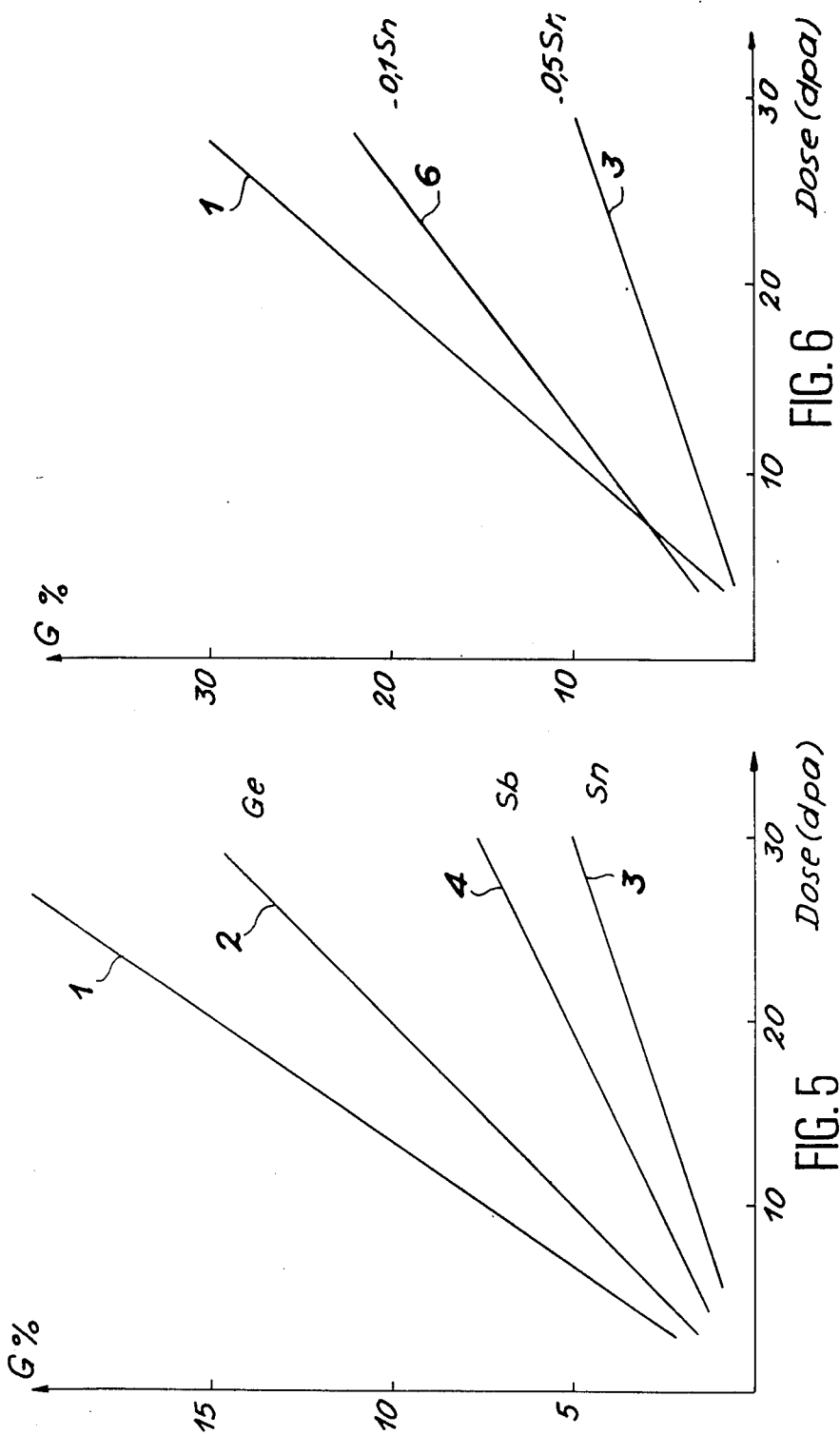

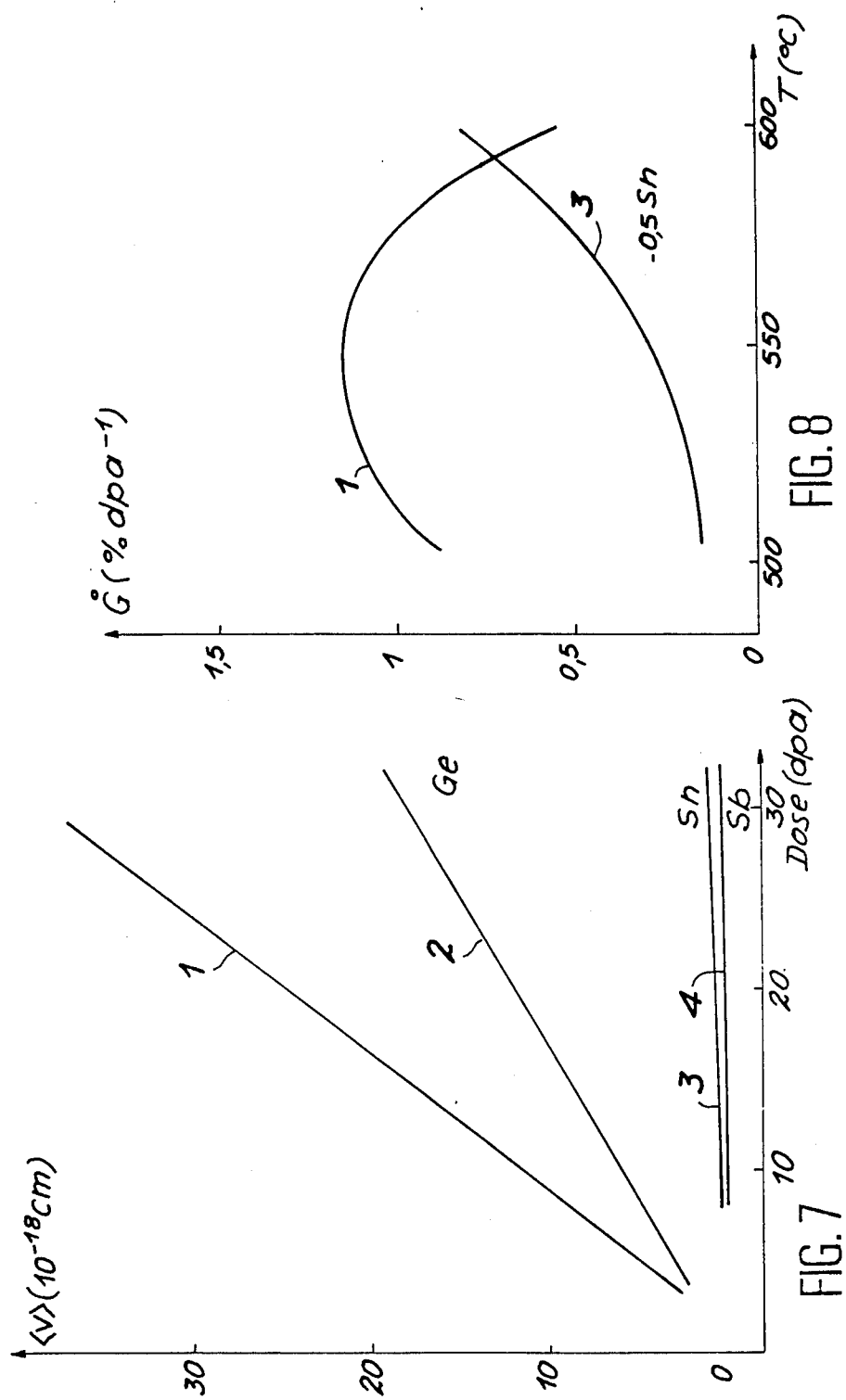

AUSTENITIC STAINLESS STEEL, PARTICULARLY USABLE AS A CORE STRUCTURAL OR CANNING MATERIAL IN NUCLEAR REACTORS

BACKGROUND OF THE INVENTION

The present invention relates to an austenitic stainless steel based on chromium, nickel and molybdenum.

More specifically it relates to austenitic stainless steel compositions usable in nuclear reactors, such as fast neutron reactors, particularly as the core structural material or as a material for canning fuel elements, which has a better resistance to swelling under irradiation than the presently used steels, e.g. those of type 316. These austenitic stainless steel compositions are also usable in fusion reactors.

At present the specific burn-up of fuel elements of nuclear reactors is mainly limited by the swelling of the cans containing the nuclear fuel and the hexagonal tubes containing the fuel rods. This phenomenon can lead to significant dimensional variations as a result of the agglomeration in cavities of part of the vacancies produced in the material by irradiation.

Thus, the irradiation of a material by high energy electrons, ions or fast neutrons produces in equal quantity vacancies and interstices and their creation is accompanied by a volume increase. If the temperature is sufficiently high, these defects which are produced out of equilibrium have a sufficient mobility to be eliminated by mutual recombination or absorption, or to agglomerate in the form of clusters. In the latter case, these vacancies can agglomerate and give rise to the formation of cavities and then to the growth of said cavities, which leads to a volume expansion of the material called swelling.

Hitherto, attempts have been made to limit this swelling phenomenon of canning materials by adding to the conventional austenitic alloy compositions elements such as silicon or phosphorus, as described in French Pat. No. 2 394 618, filed on 6.13.1977 by the Commissariat à L'Energie Atomique.

To further increase performances, other research has dealt with the possibility of other elements making it possible to control said swelling phenomenon under irradiation.

SUMMARY OF THE INVENTION

The present invention relates to a novel austenitic stainless steel containing additives making it possible to control the swelling phenomenon under irradiation by acting differently. This austenitic stainless steel resistant to swelling under irradiation by electrons, ions and/or neutrons comprises at least one additional element chosen from among tin, germanium and antimony with a total content from 0.05 to 1% by weight.

More specifically, the austenitic stainless steel according to the invention comprises by weight 10 to 28% nickel, up to 3% molybdenum, 8 to 18% chromium, up to 0.12% carbon, up to 2% manganese, up to 1% silicon, 0 to 0.65% titanium, 0 to 0.008% boron, and 0.05 to 1% in all of at least one element chosen from among tin, germanium and antimony, the remainder being constituted by iron and incidental impurities.

Examples of incidental impurities are aluminum, copper, nitrogen, sulphur, phosphorus, oxygen and hydrogen which are generally found in trace state in steels of this type.

In the stainless steel according to the invention, the addition of germanium, tin and/or antimony makes it possible to improve the behavior under irradiation of steels. According to the invention, it is possible to add these elements simultaneously, provided that their total content is in the range from 0.05 to 1% by weight of the steel. However, generally only one of these elements is used to obtain the desired effect. As will be shown hereinafter, the presence of these elements has the effect of limiting the growth of cavities formed in the steel by irradiation, which was not obtained with the hitherto added elements.

Preferably, according to the invention, the total content of the elements chosen from among germanium, tin and antimony is at the most 0.5% by weight. This content is generally adequate to greatly improve the resistance to swelling of the steels.

According to an embodiment of the invention, the basic stainless steel is of type Z8CND 17-12 (Specification AFNOR), to which is added according to the invention germanium, tin and/or antimony and optionally titanium. In this case, the steel comprises by weight 10 to 14% nickel, 2 to 3% molybdenum, 16 to 18% chromium, up to 0.1% carbon, up to 2% manganese, up to 1% silicon, 0 to 0.65% titanium, 0.05 to 1% in all of at least one element chosen from among tin, germanium and antimony, the remainder being constituted by iron and incidental impurities.

In the case of steels of this type, the addition of tin, germanium and/or antimony is generally limited to 0.5% by weight, as was stated hereinbefore. Moreover, it is preferable that these steels contain 0.1 to 0.65% and better still 0.10 to 0.45% by weight titanium.

According to a second embodiment of the invention, the basic steel corresponds to steels of type 15—15, whereof the matrix is formed from 15% by weight nickel and 15% by weight chromium.

In this case, the steel comprises by weight 14 to 16% nickel, 1 to 3% molybdenum, 14 to 16% chromium, up to 0.12% carbon, up to 2% manganese, up to 1% silicon, 0 to 0.008% boron, 0 to 0.65% titanium, 0.05 to 1% in all of at least one element chosen from among tin, germanium and antimony, the remainder being constituted by iron and incidental impurities.

According to a third embodiment of the invention, the basic steel has a matrix comprising 10% chromium and 25% nickel. In this case, the steel comprises 23 to 28% nickel, 1 to 3% molybdenum, 8 to 13% chromium, up to 0.12% carbon, up to 2% manganese, up to 1% silicon, 0 to 0.65% titanium, 0 to 0.008% boron, 0.05 to 1% in all of at least one element chosen from among tin, germanium and antimony, the remainder being constituted by iron and incidental impurities.

In all the embodiments of the invention, it is preferable for the alloy to contain the following additional elements: carbon, manganese, silicon, in the preferred ranges indicated hereinafter: 1 to 2% manganese, 0.2 to 1% silicon and 0.02 to 0.12% by weight carbon, preferably 0.08 to 0.12% by weight in the case of steels of type 15—15.

Thus, these additional elements have a generally beneficial effect on the mechanical properties of the alloys.

With regards to the additional elements chosen from among germanium, tin and antimony, the total content thereof is generally limited to 0.5% by weight, as was stated hereinbefore. Moreover, it is preferable to only add one of these elements, e.g. tin.

The steels according to the invention can be produced by any known process, e.g. melting in an electric furnace, arc furnace or induction furnace. The steel can then undergo a heat treatment, e.g. a reannealing treatment performed e.g. at a temperature exceeding 1000° C. in an argon atmosphere. The steel can then undergo work-hardening, e.g. rolling.

BRIEF DESCRIPTION OF THE DRAWINGS

The invention is described in greater detail hereinafter relative to non-limitative embodiments and the attached drawings, wherein:

FIG. 5 is a graph showing the evolution of the swelling at 500° C., as a function of the radiation dose for different austenitic stainless steels according to the invention.

FIG. 6 is a graph showing the evolution of the swelling at 550° C., as a function of the radiation dose for different austenitic stainless steels according to the invention.

FIG. 7 is a graph showing the evolution of the mean volume of the cavities, as a function of the radiation dose at a temperature of 500° C. for the steels according to the invention.

FIG. 8 is a graph showing the influence of the temperature on the swelling speed under irradiation for a steel according to the invention.

DETAILED DESCRIPTION OF THE PREFERRED EMBODIMENTS

The following description illustrates the results obtained by modifying steels of type Z8CND17-12 or Fe-15Cr-20Ni steels by adding germanium, tin or antimony.

The alloys of type Z8CND17-12 are prepared by melting in an arc furnace under residual argon pressure. They then undergo a homogenization treatment at 1250° C. for five hours, followed by hot rolling at 1150° C. in several passes bringing the thickness of the sheets to 2 mm. This operation is followed by chemical etching, cold rolling leading to a sheet thickness of 1.25 mm, reannealing at 1100° C. and a final 20% cold-hardening performed by cold rolling. This gives sheets with a thickness of 1 mm. The Fe-15Cr-20Ni steels are prepared by melting in an induction furnace Fe, Cr, Ni, and the additional element. They are then rolled and tempered from 1300° C.

In order to then check the properties of the steels under irradiation, small 2 cm×2 cm plates are then cut from the sheets obtained and are placed in a boat under argon for 10 minutes at a temperature of 1150° C. Annealing is then carried out by removing the boat from the hot area of the furnace, fast cooling being ensured by the argon flow. Following reannealing, the materials are made thinner by mechanical polishing until a thickness of 70 $\mu$m is obtained. Diameter 3 mm disks are then cut into the thin small plates. The disks then undergo electrolytic polishing under the following conditions: composition of the electrolyte: 70% ethyl alcohol, 20% ethylene glycol monobutyl ether and 10% perchloric acid; bath temperature: 12° C.; current intensity 140 mA, obtained by a voltage of approximately 22 V.

This is followed by carefully rinsing the thin disks in alcohol, followed by drying. They then undergo irradiation tests performed by means of an electron beam under the following conditions:

energy of the electrons: 1 MeV, irradiated regions chosen in grains oriented according to planes (110), beam diameter: 2 $\mu$m, point defect production rate: 20 dpa.h$^{-1}$ in the central zone of the beam.

Figure 9:
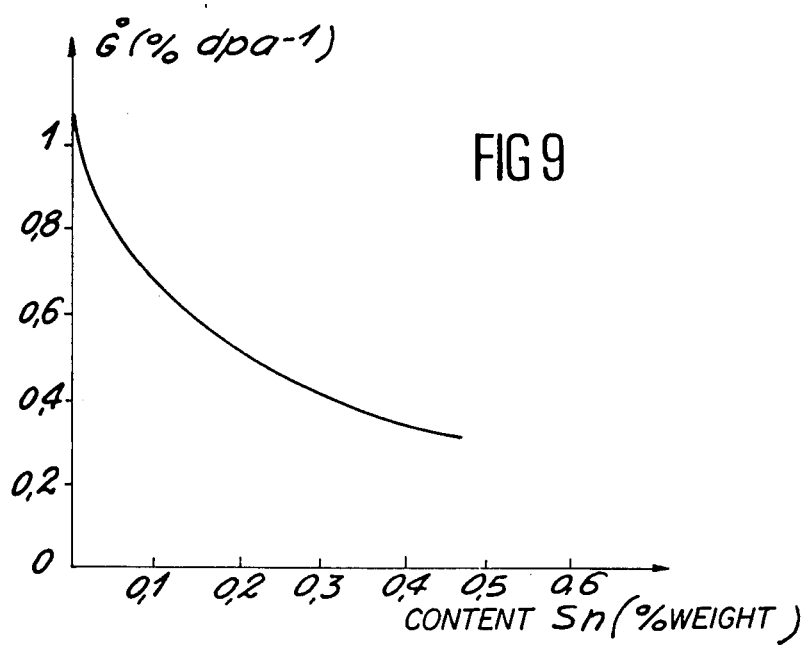
FIG. 9 is a graph showing the influence of the tin content on the swelling rate of steels according to the invention at 550° C.

These conditions make it possible to simulate irradiation in fast neutron reactors. The instantaneous flows are higher (approximately $5.10^{-3}$ dpa s$^{-1}$) than what they typically are in a fast neutron reactor (approximately $2.10^{-6}$ dap s$^{-1}$), which would only have the effect of displacing the swelling maximum towards higher temperatures. However, as can be seen in FIG. 9, the swelling maximum is only slightly displaced because in the case of steel Z8CND17-12 it occurs at 550° C. in these tests, which essentially corresponds to the value obtained in a fast neutron reactor.

For carrying out the tests, the thin disks are placed on a heating stage of a microscope and they are irradiated by an electron beam. Groups of micrographs taken at regular intervals then make it possible to measure the swelling as a function of the radiation dose.

The electron beam used extends over a surface with a diameter of approximately 2 $\mu$m. There is essentially no variation to the flow in the central part and it can be considered as constant over a surface with a diameter of approximately 0.8 $\mu$m.

This electron flow is very intense, being approximately $1 \cdot 5 \cdot 10^{20}$ electrons·cm$^{-2}$·s$^{-1}$. The intensity in the central part of the beam is close to $10^{-7}$ A, which corresponds to a point defect production rate of approximately 20 dpa h$^{-1}$ taking a value of 35 eV for the displacement threshold energy.

It is pointed out that the dose unit dpa represents the number of times on average that an atom of the crystal lattice is displaced.

In order to characterize the swelling, micrographs are taken of the irradiated area every five dpa and in the volume of material where the electron flow is constant, the total volume occupied by the cavities is determined. It is possible to deduce therefrom the swelling given by the formula:

$$G = \frac{\Sigma N_i V_i}{V_t}$$

in which $N_i$ is the number of cavities of volume $V_i$ and $V_t$ is the volume of material containing the measured cavities.

For each dose, the swelling obtained is broken down into two parameters, which are the density of the cavities $\rho_c$ and the mean volume (V), which are given by the following formulas:

$$\rho_c = \frac{\Sigma N_i}{V_t} \text{ and } V = \frac{\Sigma N_i V_i}{\Sigma N_i}$$

These two essential components of the swelling characterize the nucleation and growth of cavities.

The cavity size histogram characterized by the term $\Sigma N_i V_i$ is determined with the aid of a Zeiss particle analyzer working on pictures printed with a magnification of 200,000 or 500,000.

The second parameter involved is the volume of matter containing the measured cavities $V_t$ expressed by the formula:

$$V_t = \frac{\pi d^2 e}{4}$$

in which d is the real diameter of the micrograph zone where the histogram is made and e is the thickness of material containing the measured cavities, which is determined by stereoscopy.

The irradiation tests are performed at temperatures of 500°, 550° or 600° C. It is pointed out that 500° C. is between the temperature corresponding to the maximum flow of the cans and that corresponding to the maximum flow of the hexagonal tubes in a fast neutron reactor using disks formed from steel 1 to 6 and which have the composition given in the enclosed table.

Alloys 1 and 5 are reference alloys containing no additives according to the invention, whilst alloys 2 to 4 and 6 to 8 are alloys according to the invention.

The results of the irradiation tests are given in the drawings. FIGS. 1 to 4 are micrographs illustrating the structure of material following irradiation at 500° C. for a dose of 20 dpa.

Figure 1:
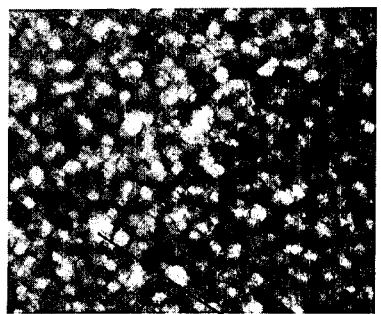
FIGS. 1, 2, 3 and 4, are micrographs relating respectively to an austenitic stainless steel of type Z8CND17-12 without additive (FIG. 1), stainless steels of type Z8CND17-12 modified by the addition of 0.3% by weight germanium (FIG. 2), 0.5% by weight tin (FIG. 3) and 0.5% by weight antimony (FIG. 4).
Figure 2:
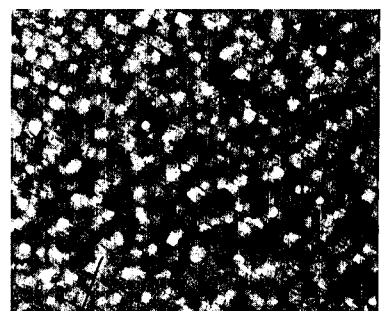
Figure 3:
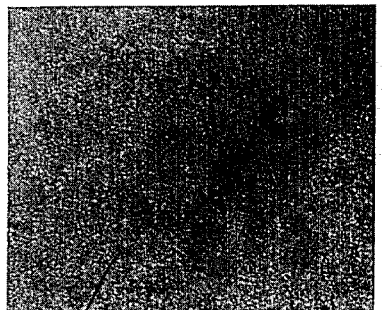
Figure 4:
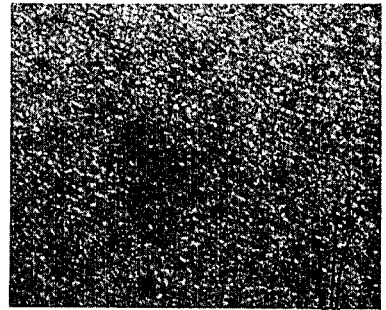

FIG. 1 relates to steel 1, which is an austenitic steel of type Z8CND17-12 according to the prior art, whilst FIGS. 2, 3, 4 respectively relate to alloys 2, 3 and 4 in the table. It can be seen that in the case of the prior art austenitic steel the cavities C are of a significant size and there is a significant swelling under irradiation.

Although in FIGS. 2 to 4 the number of cavities C is greater, their size is smaller, particularly in the case of steels 3 and 4 respectively having additions of tin and antimony. Thus, the effect of these additives is not to decrease the number of cavities without affecting their growth, but to assist the nucleation of the cavities, whilst reducing their size. In the case of tin and antimony, there is a very marked effect on the reduction of cavity growth.

FIG. 5 shows the evolution of swelling under irradiation (in %), as a function of the radiation dose (in dpa), when the latter is effected at a temperature of 500° C. Lines 1, 2, 3 and 4 therein respectively relate to steels 1, 2, 3 and 4.

It is clear from FIG. 5 that swelling increases continuously during irradiation and is a linear function of the dose. However, this swelling is reduced by the addition of germanium, antimony or tin and it is significantly reduced in the case of a 0.5% by weight tin addition.

FIG. 6 shows the evolution of the swelling, as a function of the radiation dose for tests performed at 550° C. with alloys 3 and 6, which have different tin contents. It is clear that the swelling limitation effect increases with the tin content of the alloy.

FIG. 7 shows the evolution of the mean volume of the cavities, as a function of the radiation dose for tests performed at 500° C. on alloys 1 to 4. It can be seen that the mean volume of the cavities virtually does not increase in the case of alloys 3 and 4, which have additions of tin and antimony.

FIG. 8 illustrates the influence of the temperature on the swelling rate of the alloys, expressed as percentages of the swelling per dpa for steels 1 and 3 in the case of tests performed at temperatures from 500° to 600° C.

As can be gathered from FIG. 8, the swelling rate is a curve passing through a maximum in the case of steel 1, where said maximum corresponds to a temperature of 550° C., which is close to that obtained in a fast neutron reactor. However, in the case of steel 3, the swelling maximum is obtained at temperatures above 600° C. Therefore, in the temperature range 550° to 600° C., tin has a reduced effect on the swelling rate. To obviate this disadvantage, it is merely necessary to use a steel simultaneously containing tin and titanium, because the latter has a stabilizing effect by eliminating the nucleation of the cavities.

FIG. 9 illustrates the influence of the tin content on the swelling rate (in % dpa$^{-1}$) of a type Z8CND17-12 steel having tin additions ranging between 0 and 0.5% by weight for tests performed at 550° C. It is clear that the swelling rate decreases as a function of the tin content. It is assumed that this decrease is essentially due once again to a marked effect of the tin on the growth of the cavities.

Figure 10:
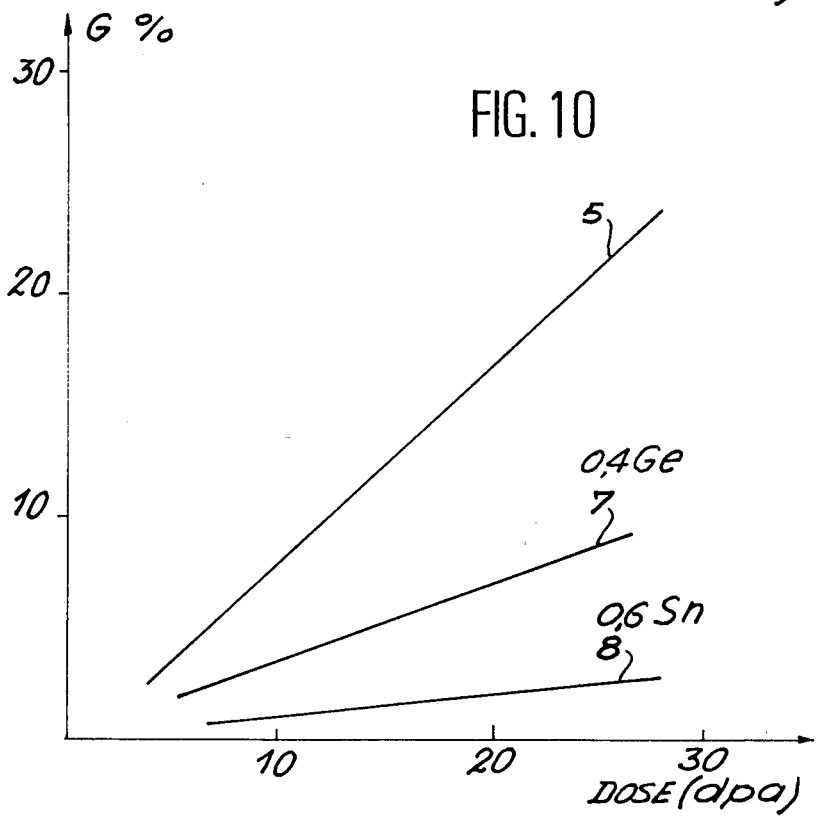
FIG. 10 is a graph showing the evolution of the swelling at 550° C., as a function of the radiation dose for different austenitic stainless steels according to the invention.

FIG. 10 shows the evolution of swelling under irradiation at 500° C. (as a %), as a function of the radiation dose (in dpa) for steels of Fe-15Cr-20Ni type comprising additions of germanium or tin. Lines 5, 7 and 8 therein respectively relate to steels 5, 7 and 8 of the table.

It is clear from FIG. 10 that swelling is reduced by the addition of germanium or tin, particularly by the addition of 0.6% by weight tin.

Figure 11:
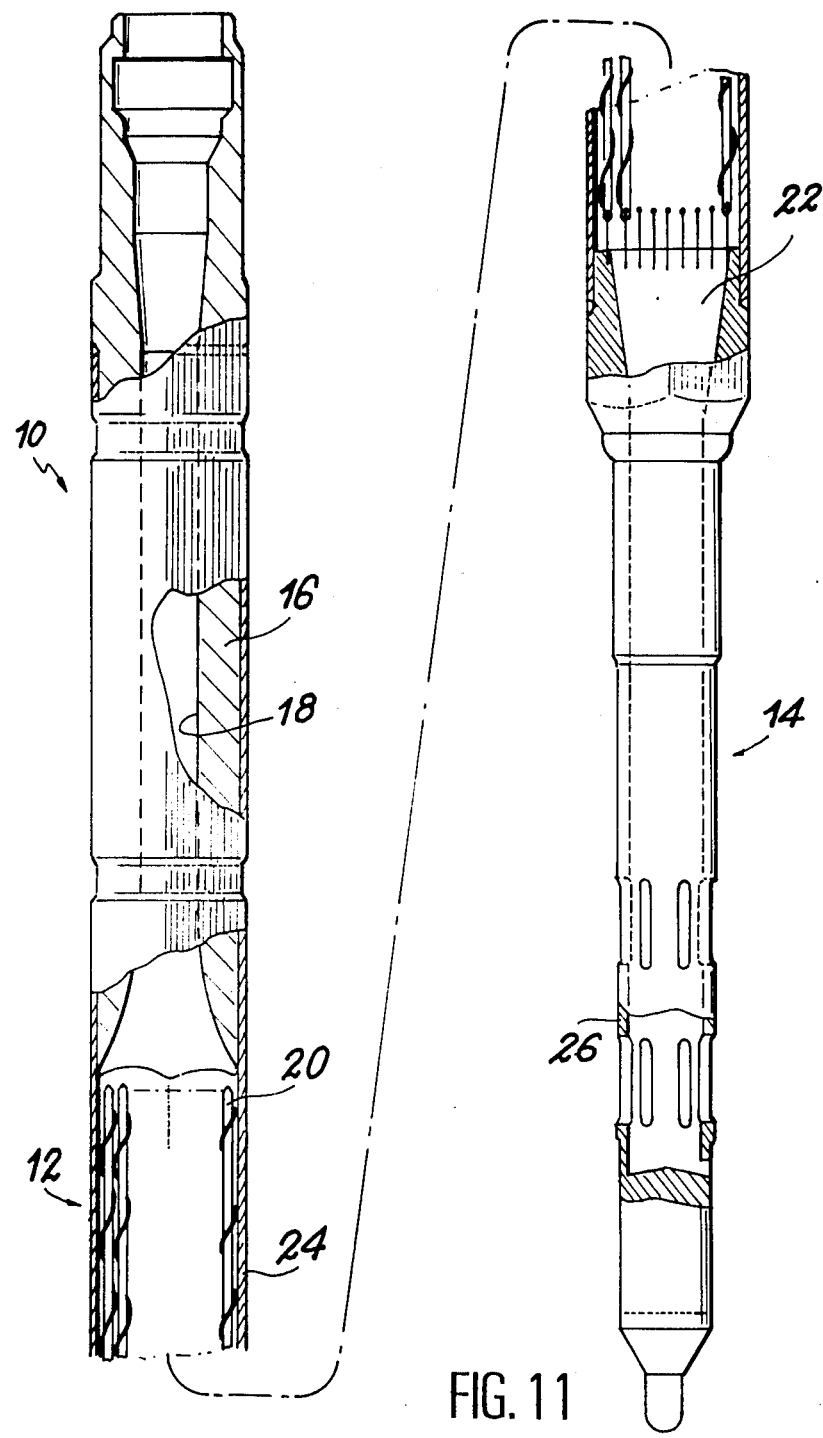
FIG. 11 (left-hand and right-hand parts), represents sectional views showing the upper and lower portions of a fuel assembly for a fast neutron reactor.

FIG. 11 shows a fuel assembly for use in a fast neutron nuclear reactor. Starting from the top, the assembly essentially comprises an upper neutron protection 10, a fissile part 12 and a foot 14. The upper neutron protection 10 is constituted by an annular steel block 16 having a passage 18 along the vertical axis of the assembly and via which the sodium reheated by passing through fissile part 12 leaves the assembly. The fissile part 12 comprises a bundle of fuel rods 20 fixed by their lower end to an attachment grid 22. This bundle is located in a hexagonal tube 24.

The foot or base 14 of the assembly comprises a cylindrical tube 26, which has a smaller diameter than the cross-section of hexagonal tube 24. According to the invention, the can of the fuel rods 20 and/or the hexagonal tube 24 wherein the bundle of fuel rods is located, are constituted of a stainless steel of the invention of which the resistance to swelling under irradiation has been improved by the presence of at least one element selected among tin, germanium and antimony.

TABLE

| Steel | n°1 | n°2 | n°3 | n°4 | n°5 | n°6 | n°7 | n°8 |
| --- | --- | --- | --- | --- | --- | --- | --- | --- |
| Cr | 16.8 | 16.8 | 16.8 | 16.8 | 15.4 | 16.8 | 14.9 | 15 |

TABLE -continued

| Steel | n°1 | n°2 | n°3 | n°4 | n°5 | n°6 | n°7 | n°8 |
|---|---|---|---|---|---|---|---|---|
| Ni | 13.2 | 13.2 | 13.2 | 13.2 | 20.2 | 13.2 | 20.1 | 20.3 |
| Mn | 1.4 | 1.4 | 1.4 | 1.4 | — | 1.4 | — | — |
| Mo | 2.12 | 2.2 | 2.05 | 2.1 | — | 2.1 | — | — |
| C | 0.054 | 0.057 | 0.054 | 0.057 | 0.005 | 0.057 | 0.005 | 0.005 |
| Si | 0.55 | 0.49 | 0.56 | 0.49 | — | 0.49 | — | — |
| Ge | — | 0.3 | — | — | — | — | 0.4 | — |
| Sn | — | — | 0.5 | — | — | 0.1 | — | 0.6 |
| Sb | — | — | — | 0.5 | — | — | — | — |
| Fe | remainder | remainder | remainder | remainder | remainder | remainder | remainder | remainder |

What is claimed is:

1. An austenitic stainless steel which comprises essentially of by weight: 10 to 28% nickel, 1 to 3% molybdenum, 8 to 18% chromium, up to 0.12% carbon, up to 2% manganese, up to 1% silicon, 0 to 0.65% titanium, 0 to 0.008% boron, 0.05 to 1% of germanium, the remainder being constituted by iron and incidental impurities.

2. An austenitic stainless steel according to claim 1, which consists essentially of by weight: 10 to 14% nickel, 2 to 3% molybdenum, 16 to 18% chromium, up to 0.1% carbon, up to 2% manganese, up to 1% silicon, 0 to 0.65% titanium, 0.05 to 1% of germanium, the remainder being constituted by iron and incidental impurities.

3. An austenitic stainless steel according to claim 2, which comprises 0.10 to 0.45% by weight titanium.

4. An austenitic stainless steel according to claim 1, which consists essentially of by weight: 14 to 16% nickel, 1 to 3% molybdenum, 14 to 16% chromium, up to 0.12% carbon, up to 2% manganese, up to 1% silicon, 0 to 0.008% boron, 0 to 0.65% titanium, 0.05 to 1% of germanium, the remainder being constituted by iron and incidental impurities.

5. An austenitic stainless steel according to claim 1, which consists essentially of by weight: 23 to 28% nickel, 1 to 3% molybdenum, 8 to 13% chromium, up to 0.12% carbon, up to 2% manganese, up to 1% silicon, 0 to 0.65% titanium, 0 to 0.008% boron, 0.05 to 1% of germanium, the remainder being constituted by iron and incidental impurities.

6. A component of a nuclear reactor resistant to swelling under irradiation which comprises an austenitic stainless steel consisting essentially of by weight: 10 to 28% nickel, 1 to 3% molybdenum, 8 to 18% chromium, up to 0.12% carbon, up to 2% manganese, up to 1% silicon, 0 to 0.65% titanium, 0 to 0.008% boron, 0.05 to 1% in all of at least one element selected from the group consisting of tin, germanium and antimony, the remainder being constituted by iron and incidental impurities.

7. A component according to claim 6, wherein the austenitic stainless steel consisting essentially of by weight: 10 to 14% nickel, 2 to 3% molybdenum, 16 to 18% chromium, up to 0.1% carbon, up to 2% manganese, up to 1% silicon, 0 to 0.65% titanium, 0.05 to 1% in all of at least one element selected from the group consisting of tin, germanium and antimony, the remainder being constituted by iron and incidental impurities.

8. A component according to claim 7, wherein the amount of titanium is 0.10 to 0.45% by weight.

9. A component according to claim 6, wherein the austenitic stainless steel consists essentially of by weight: 14 to 16% nickel, 1 to 3% molybdenum, 14 to 16% chromium, up to 0.12% carbon, up to 2% manganese, up to 1% silicon, 0 to 0.008% boron, 0 to 0.065% titanium, 0.05 to 1% in all of at least one element selected from the group consisting of tin, germanium and antimony, the remainder being constituted by iron and incidental impurities.

10. A component according to claim 6, wherein the austenitic stainless steel consists essentially of 23 to 28% nickel, 1 to 3% molybdenum, 8 to 13% chromium, up to 0.12% carbon, up to 2% manganese, up to 1% silicon, 0 to 0.65% titanium, 0 to 0.008% boron, 0.05 to 1% in all of at least one element selected from the group consisting of tin, germanium and antimony, the remainder being constituted by iron and incidental impurities.

11. A component according to claim 7, wherein the austenitic stainless steel contains only a single element selected from the group consisting of tin, germanium and antimony.

12. A component according to claim 11, wherein said single element is tin.

13. A component according to claim 9, wherein the austentitic stainless steel contains only a single element selected from the group consisting of tin, germanium and antimony.

14. A component according to claim 10, wherein the austentitic stainless steel contains only a single element selected from the group consisting of tin, germanium and antimony.

* * * * *